Figure 3:
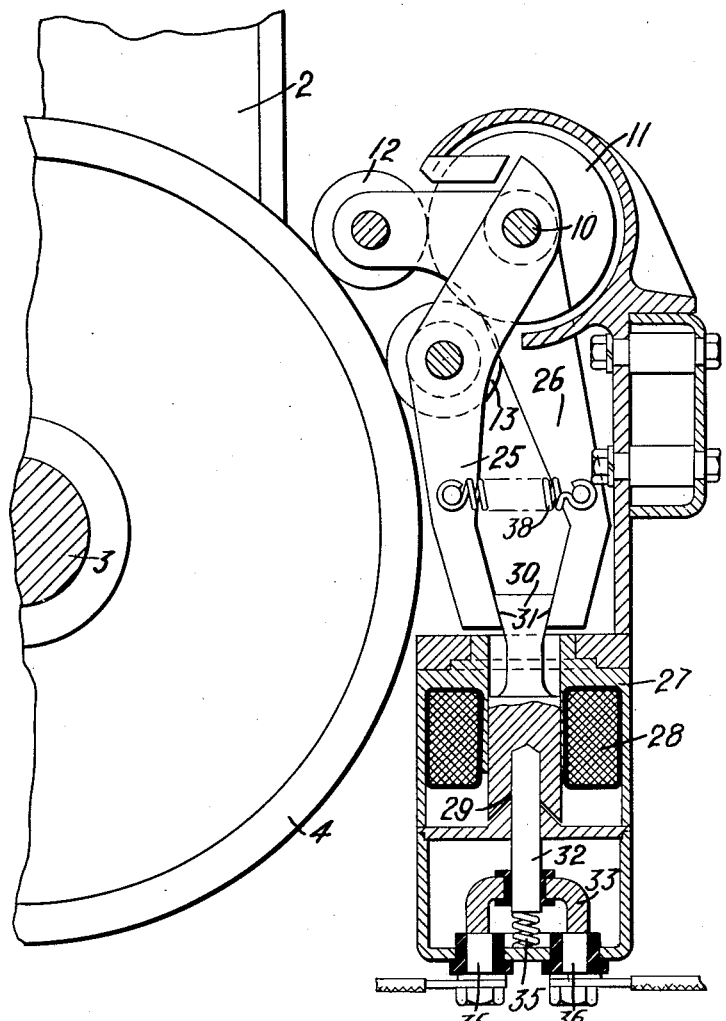

J. P. NIKONOW.
STARTING MECHANISM FOR GAS ENGINES.
APPLICATION FILED AUG. 7, 1914.
1,184,867.
Patented May 30, 1916.
2 SHEETS—SHEET 1.
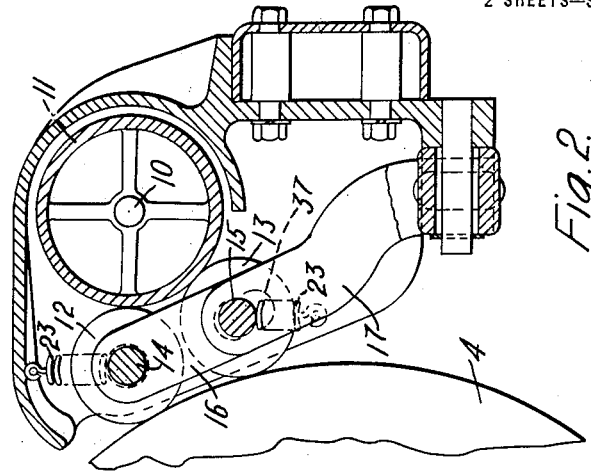
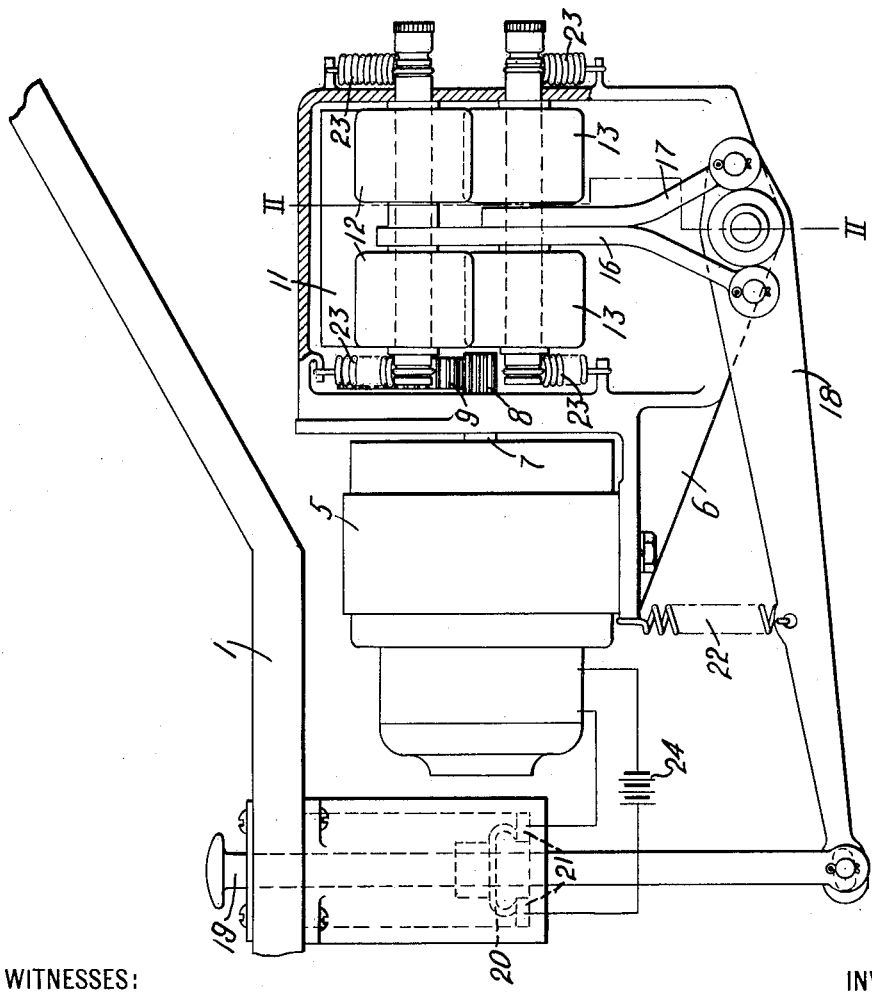
WITNESSES:
Fred A. Lind.
J. P. Langley.
INVENTOR
John P. Nikonow
BY
Ashley G. Carr
ATTORNEY J. P. NIKONOW.
STARTING MECHANISM FOR GAS ENGINES.
APPLICATION FILED AUG. 7, 1914.

1,184,867.

Patented May 30, 1916.
2 SHEETS—SHEET 2.

WITNESSES:
Fred. A. Lind
J. R. Langley,

INVENTOR
John P. Nikonow
BY
Worsley E. Carr
ATTORNEY

UNITED STATES PATENT OFFICE.

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

STARTING MECHANISM FOR GAS-ENGINES.

1,184,867. Specification of Letters Patent. Patented May 30, 1916.

Application filed August 7, 1914. Serial No. 855,595.

*To all whom it may concern:*

Be it known that I, JOHN P. NIKONOW, a subject of the Czar of Russia, and a resident of Wilkinsburg, in the county of Allegheny and State of Pennsylvania, have invented a new and useful Improvement in Starting Mechanism for Gas-Engines, of which the following is a specification.

My invention relates to starting mechanisms for gas engines and particularly to such mechanisms as embody friction gear wheels for operatively connecting starting motors to the engines of automobiles or other vehicles.

My invention has for its object to provide a mechanism of the character indicated above that is simple in construction and compact in arrangement and that is efficient in operation to effect the engagement of friction gear wheels to operatively connect a starting motor to the shaft of an internal combustion engine.

It is well known that the shaft of an internal combustion engine comes to rest in one of a plurality of positions, the number of such positions corresponding to the number of cylinders comprising the engine. When friction gear wheels are employed to start the engine, it is necessary that the coacting wheels be pressed toward each other with such force that one wheel cannot slip relatively to the other because the effect of such relative movements is to produce a corresponding number of flat portions on the periphery of the wheel connected to the engine. This action is most likely to occur when the motive power is initially applied to overcome the inertia of the load and, in addition, the compression of gas in one of the several cylinders. Since a source of power of large capacity is not available in connection with motor vehicles, it is essential that a mechanism be employed by means of which the application of a small force operates to firmly press the coacting wheels together.

I provide an arrangement by means of which the starting motor is operatively connected to the fly wheel of an internal combustion engine in such manner that relative movement of the coacting wheels is effectually prevented. I employ bodily movable friction wheels which are actuated by a lever mechanism to firmly wedge themselves between the engine fly wheel and a rotatable member that is operatively connected to the starting motor.

The details of my invention will be described in connection with the accompanying drawings in which—

Figure 4:
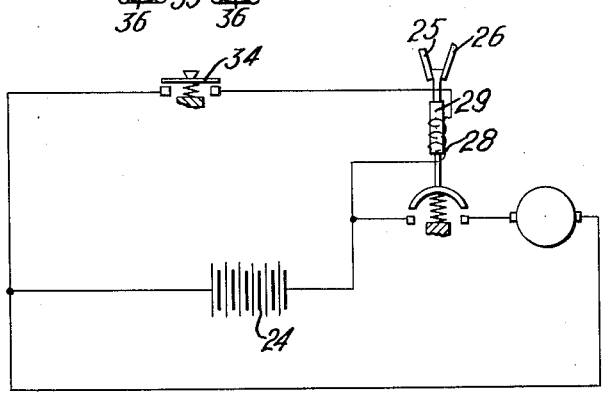

Figure 1 is a view, partially in elevation and partially in section, of a portion of an automobile with my invention attached thereto. Fig. 2 is a view, in section, on the line II—II of Fig. 1. Fig. 3 is a view, similar to Fig. 1, of a modification. Fig. 4 is a diagrammatic view of circuits and apparatus embodying my invention.

Referring to Figs. 1, 2 and 3, an automobile, a portion of which is indicated at 1, is provided with an engine 2, only a portion of which is shown. The engine 2 has a shaft 3, upon which is mounted the usual fly wheel 4.

Referring particularly to Fig. 1, an electric motor 5 is supported by a bracket 6 that is connected to the vehicle frame in any suitable manner. The motor 5 has an armature shaft 7 upon which is mounted a pinion 8. A gear wheel 9, which meshes with the pinion 8, is mounted upon a shaft 10 that carries also a friction wheel 11. Pairs of friction pinions 12 and 13, that are respectively mounted upon shafts 14 and 15, are adapted to connect the friction wheel 11 to the fly wheel 4 when they are moved bodily toward each other to firmly engage the coacting wheels.

The positions of the shafts 14 and 15 and the friction pinions 12 and 13 are respectively controlled by links 16 and 17 that are connected on opposite sides of the pivotal support of a lever 18. A rod 19, which projects through a suitable opening in the floor of the vehicle, is connected to the lever 18. The rod 19 carries the movable switch member 20 of a switch for controlling the circuit of the starting motor 5. In its closed position, the switch member 20 bridges two stationary contact members 21 to complete the motor circuit. The various parts are so arranged that the motor circuit is completed only after the friction pinions 12 and 13 have firmly engaged the friction wheel 11 and the fly wheel 4.

Normally, a spring 22 retains the rod 19 in its elevated position to disconnect the switch member 20 from the contact members 21. The friction pinions 12 and 13 are normally retained out of engagement with the fly wheel 4 by means of springs 23. When it is desired to start the engine, the rod 19 is pressed downwardly and the links 16 and 17 actuate the shafts 14 and 15 and the pinions 12 and 13 toward each other to connect the friction wheel 11 and the fly wheel 4. Relative movement between the link 16 and the shaft 15 is permitted by a slot 37 in the link 16 through which the shaft 15 extends. When the pinions 12 and 13 have reached the end of their respective paths of movement, the switch member 20 bridges the stationary contact terminals 21 to close the motor circuit through a storage battery 24. The several parts now occupy the respective positions illustrated in Figs. 1 and 2. The motor then rotates the engine shaft by means of the gear mechanism above described. When the engine starts under its own power, the operator releases the rod 19, and the several springs 22 and 23 operate to return the various parts to their respective inoperative positions in which the motor circuit is broken and the friction wheel 11 is disconnected from the fly wheel 4.

A modification is shown in Fig. 3, in which like numerals are employed to designate corresponding parts. In this form of my invention, the friction pinions 12 and 13 are respectively controlled by levers 25 and 26 that are pivotally mounted on the shaft 10. An electromagnet 27 comprises a coil 28 and a core member 29 that has an upwardly extending portion 30. The extension 30 is provided with inclined portions 31 which coact with the extremities of the levers 25 and 26 to exert a wedging action thereon. A rod 32, which is connected to the core member 29 and projects downwardly therefrom, carries the movable member 33 of a switch for controlling the motor circuit.

Referring particularly to Fig. 4, which is a diagrammatic view of circuits and apparatus embodying the form of invention illustrated in Fig. 3, the circuit of the magnet coil 28 is controlled by a push button 34 which may be located at any point convenient to the operator. The storage battery 24 supplies current to the starting motor 5 and the magnet coil 28.

Normally, a spring 35 retains the core member 29 in its elevated position, and a spring 38 draws the levers 25 and 26 toward each other to disengage the pinions 12 and 13 from the fly wheel 4. To start the engine, the operator presses the push button 34, and the magnet coil 28 is energized to actuate the core member 29 downwardly. The extension 30 operates, by means of its inclined sides 31, to separate the arms of the levers 25 and 26 and thus to simultaneously actuate the pinions 12 and 13 toward each other to engage the fly wheel 4. When the coacting friction surfaces of the several wheels are firmly engaged, the switch member 33 bridges stationary contact terminals 36 to complete the motor circuits. The several parts now occupy the respective positions illustrated in Fig. 3.

When the engine starts under its own power, the operator releases the push button 34 to deënergize the magnet coil 28. The spring 35 then operates to return the core member 29 to its upper position and thus open the motor circuit. The upward movement of the extension 30 permits the spring 38 to draw the arms of the levers 25 and 26 toward each other, and thereby disconnect the pinions 12 and 13 from the fly wheel 4. It will be noted that I provide an arrangement that occupies a small space and requires a small amount of energy for its operation to press the friction wheels together with a heavy pressure. I provide also a simple and effective means for automatically effecting the operative connection of a starting motor to an internal combustion engine by the actuation of a single push button.

By providing double the usual number of friction pinions, I correspondingly increase the amount of engaging surface and thereby effectually prevent the slipping of one wheel upon the surface of the other. When a large area of engaging surface is provided, the pressures employed between the coacting wheels and applied to their bearings may be materially reduced.

I claim as my invention:

1. In a starting mechanism, the combination with a rotatable member, and a motor, of means comprising a pair of simultaneously and oppositely shiftable wheels for operatively connecting said motor to said member, and manually operable means for simultaneously shifting said wheels and effecting the operation of said motor.

2. In a starting mechanism, the combination with a rotatable member, and a motor, of means comprising a pair of bodily movable wheels for operatively connecting said motor to said member, and common means for shifting said wheels simultaneously in opposite directions and effecting the operation of said motor.

3. In a starting mechanism, the combination with an engine shaft, a wheel thereon, a starting motor and a wheel operatively connected thereto, of means for operatively connecting said wheels, said means comprising a pair of bodily movable friction wheels, and means for simultaneously actuating said movable wheels toward each other and effecting the operation of said motor.

4. In a starting mechanism, the combination with an engine fly wheel, a motor, and a wheel operatively connected thereto, of means comprising a pair of bodily movable friction pinions for connecting said wheel to said fly wheel, and a lever mechanism for simultaneously actuating said pinions and controlling said motor.

5. In a starting mechanism, the combination with an engine shaft, and an electric starting motor, of means comprising a pair of friction wheels for operatively connecting said motor to said engine shaft, and a lever mechanism for actuating said wheel simultaneously in opposite directions to effect said connection and for closing the circuit of said motor.

In testimony whereof, I have hereunto subscribed my name this 27th day of July 1914.

JOHN P. NIKONOW.

Witnesses:
B. B. HINES,
M. C. MERZ.